United States Patent
Yokoe

(10) Patent No.: US 8,499,162 B2
(45) Date of Patent: Jul. 30, 2013

(54) NON-TRANSITORY COMPUTER READABLE MEDIUM STORING PROGRAM, INFORMATION PROCESSING APPARATUS, AND INFORMATION PROCESSING METHOD

(75) Inventor: Kyoko Yokoe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 272 days.

(21) Appl. No.: 13/007,180

(22) Filed: Jan. 14, 2011

(65) Prior Publication Data

US 2012/0017092 A1 Jan. 19, 2012

(30) Foreign Application Priority Data

Jul. 14, 2010 (JP) ................................ 2010-159759

(51) Int. Cl.
*H04L 9/32* (2006.01)
(52) U.S. Cl.
USPC ........................................................ 713/178
(58) Field of Classification Search
None
See application file for complete search history.

(56) References Cited

U.S. PATENT DOCUMENTS

| | | | | |
|---|---|---|---|---|
| 5,465,299 A * | 11/1995 | Matsumoto et al. | .......... | 713/176 |
| 5,661,805 A | 8/1997 | Miyauchi | | |
| 7,793,107 B2 | 9/2010 | Takahashi | | |
| 8,185,950 B2 * | 5/2012 | Masui | .............................. | 726/20 |
| 2003/0120939 A1 * | 6/2003 | Hughes et al. | ................ | 713/191 |
| 2006/0095795 A1 * | 5/2006 | Nakamura et al. | ............ | 713/193 |
| 2010/0023773 A1 * | 1/2010 | Todaka | .......... | 713/176 |
| 2010/0198712 A1 * | 8/2010 | Benisti et al. | ................... | 705/34 |

* cited by examiner

*Primary Examiner* — Gilberto Barron, Jr.
*Assistant Examiner* — Abdulhakim Nobahar
(74) *Attorney, Agent, or Firm* — Sughrue Mion, PLLC

(57) ABSTRACT

A non-transitory computer readable medium storing a program causing a computer to execute a process including: accepting an instruction for verifying an electronic signature added to information; verifying the electronic signature on the basis of an electronic certification corresponding to the electronic signature in accordance with the accepted instruction; calculating, when it is determined that the information has not been tampered with, a hash value of a combination of the information, the electronic signature, and validity-period information indicating a validity period of the electronic certification; adding a time stamp to the calculated hash value; outputting the information, the electronic signature, the hash value, and the validity-period information to a storage device; and outputting, when it is determined that the information has not been tampered with, a verification result including information indicating that the information has not been tampered with.

4 Claims, 8 Drawing Sheets

NON-TRANSITORY COMPUTER READABLE MEDIUM STORING PROGRAM, INFORMATION PROCESSING APPARATUS, AND INFORMATION PROCESSING METHOD

CROSS-REFERENCE TO RELATED APPLICATIONS

This application is based on and claims priority under 35 USC 119 from Japanese Patent Application No. 2010-159759 filed Jul. 14, 2010.

BACKGROUND (i) Technical Field

The present invention relates to a non-transitory computer readable medium storing a program, an information processing apparatus, and an information processing method.

(ii) Related Art

There are technologies associated with verification of electronic signatures.

SUMMARY

The gist of the present invention resides in the following individual aspects of the invention.

According to an aspect of the present invention, there is provided a non-transitory computer readable medium storing a program. The program causes a computer to execute a process. The process includes: accepting an instruction for performing verification of an electronic signature which is added to information; verifying the electronic signature on the basis of an electronic certification corresponding to the electronic signature in accordance with the accepted instruction; calculating, when it is determined that the information to which the verified electronic signature is added has not been tampered with, a hash value of a combination of the information, the electronic signature which is added to the information, and validity-period information indicating a validity period of the electronic certification corresponding to the electronic signature; adding a time stamp to the calculated hash value; outputting, to a storage device, the information to which the verified electronic signature is added, the electronic signature, the hash value to which the time stamp has been added, and the validity-period information so that the information, the electronic signature, the hash value, and the validity-period information correspond to one another; and outputting a verification result when it is determined that the information to which the verified electronic signature is added has not been tampered with, the verification result including information indicating that the information has not been tampered with.

BRIEF DESCRIPTION OF THE DRAWINGS

Exemplary embodiments of the present invention will be described in detail based on the following figures, wherein.

DETAILED DESCRIPTION

Hereinafter, an example of one exemplary embodiment for realizing the present invention will be described with reference to the figures.

Figure 1:
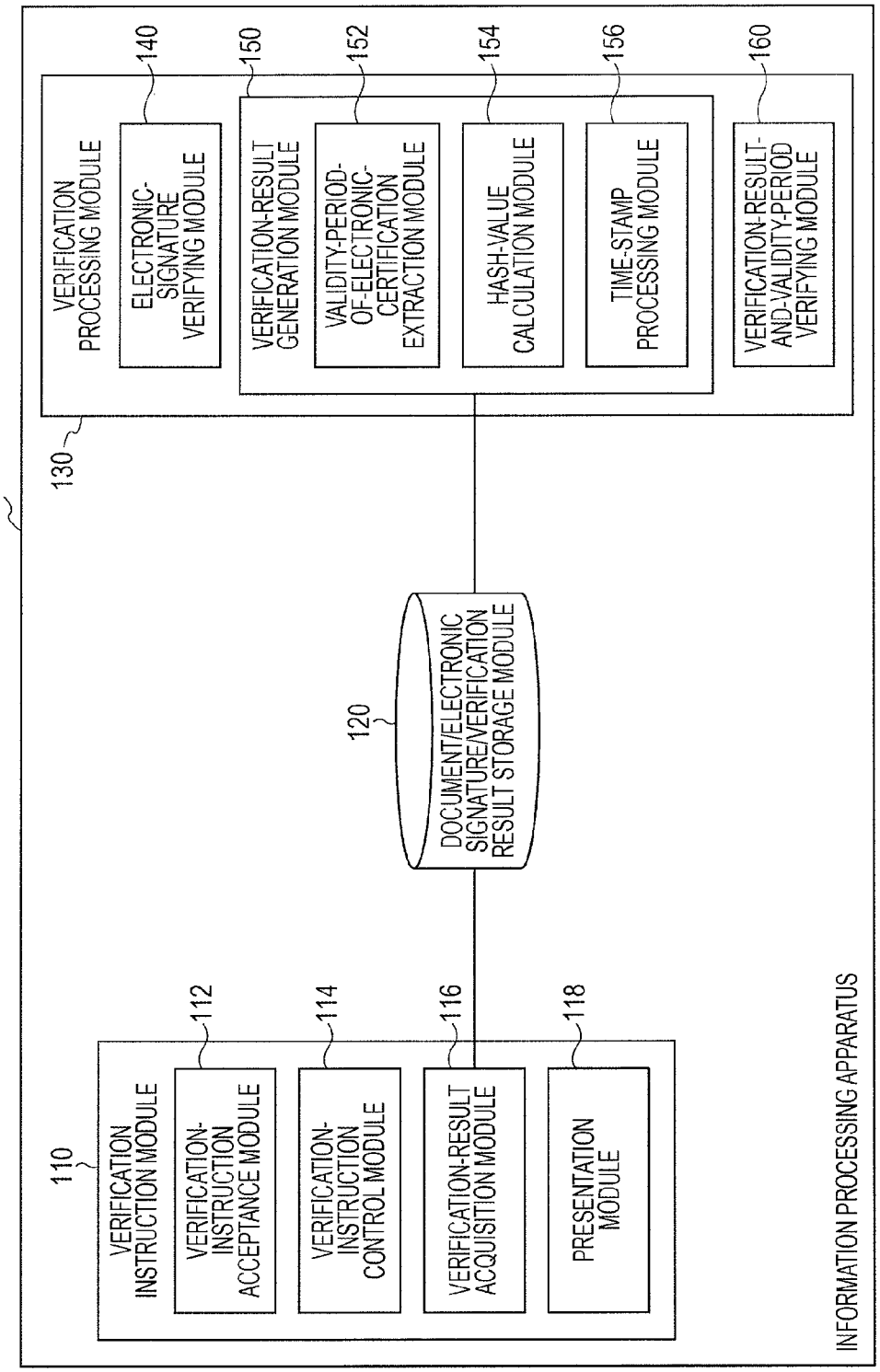
FIG. 1 is a schematic module-configuration diagram illustrating an example of a configuration in the present exemplary embodiment.

FIG. 1 is a schematic module-configuration diagram illustrating an example of a configuration in the present exemplary embodiment.

Note that the term "modules" refers to typically and logically separable components of software (a computer program), hardware, or the like. Accordingly, the term "modules" in the present exemplary embodiment refers to not only modules in a computer program, but also modules in a hardware configuration. Thus, in the present exemplary embodiment, a description of computer programs for functioning as the modules (a program for causing a computer to perform each procedure, a program for causing a computer to function as each unit, and a program for causing a computer to realize each function) is included, and a description of a system and method is also included. Note that, for convenience of description, the term "store", the term "cause an object to store", and terms having meanings the same as those of the terms are used. When an exemplary embodiment is realized using a computer program, the terms mean "causing a storage device to store" or "performs control so that a storage device is caused to store. Furthermore, modules may correspond to functions in a one-to-one manner. However, in a case of implementation, one module may be configured using one program, or multiple modules may be configured using one program. In contrast, one module may be configured using multiple programs. Moreover, multiple modules may be executed by one computer, or one module may be executed by multiple computers that can operate in a distribution or parallel environment. Note that, in one module, another module may be included. Additionally, hereinafter, the term "connection" is used to express not only physical connection, but also logical connection (reception of data, instructions, reference relationships among data, and so forth).

In addition, the term "system" or the term "apparatus" refers to not only a system or apparatus having a configuration in which multiple computers, pieces of hardware, apparatuses, or the like are connected to each other via a communication unit such as a network (including communication connection established in one-to-one manner), but also a system or apparatus that is realized by one computer, one piece of hardware, one apparatus, or the like. The term "apparatus" and the term "system" are used as terms having the same meaning. As a matter of course, the meaning of the term "system" does not include the meaning of only a social "mechanism" (a social system) that represents agreement among men.

Furthermore, information that is a target is read from a storage device for each of processes that are performed by individual modules or for each of processes in a case in which the multiple processes are performed in a module. After the process is performed, a result of the process is written into the storage device. Accordingly, a description of reading from the storage device before the process is performed and writing into the storage device after the process is performed is omitted in some cases. Note that, here, examples of the storage device may include a hard disk (HD), a random-access memory (RAM), an external storage medium, a storage medium that is connected via a communication line, and a register that is included in a central processing unit (CPU).

An information processing apparatus 100 in the present exemplary embodiment is an apparatus that performs verification of an electronic signature which is added to information. As illustrated in the example shown in FIG. 1, the information processing apparatus 100 has a verification instruction module 110, a document/electronic signature/verification result storage module 120, and a verification processing module 130.

The verification instruction module 110 has a verification-instruction acceptance module 112, a verification-instruction control module 114, a verification-result acquisition module 116, and a presentation module 118. The verification instruction module 110 mainly accepts a verification instruction, controls a verification process, presents a verification result, and so forth.

The verification-instruction acceptance module 112 accepts an instruction for performing verification of an electronic signature that is added to information. Here, electronic data that can be handled by a computer is used as information. Hereinafter, mainly, the present exemplary embodiment will be described by providing an electronic document by way of example. Note that an electronic document may be configured using text data. In some cases, an electronic document may be configured using electronic data such as images, moving images, or sounds, or using a combination of text data and electronic data. The electronic document is a document that can be targeted for storage, compiling, retrieval, or the like, and that can be exchanged as an individual unit between systems or users. Examples of the electronic document also include documents similar to the above-mentioned document. Furthermore, regarding the contents of the electronic document, any document to which an electronic signature may be added may be used as the electronic document, and, for example, a business document may be applied as the electronic document.

The verification-instruction control module 114 controls the other modules in accordance with the instruction that has been accepted by the verification-instruction acceptance module 112.

The verification-result acquisition module 116 is connected to the document/electronic signature/verification result storage module 120. The verification-result acquisition module 116 acquires a hash value and validity-period information, which correspond to information to which a verified electronic signature is added, from the document/electronic signature/verification result storage module 120 in accordance with the instruction that has been accepted by the verification-instruction acceptance module 112. Furthermore, the verification-result acquisition module 116 may acquire a combination of information, an electronic signature, a hash value to which a time stamp is added, and validity-period information.

Additionally, when corresponding data does not exist in the document/electronic signature/verification result storage module 120, i.e., when the verification-result acquisition module 116 has acquired no hash value and no validity-period information, the verification-instruction control module 114 performs control so that verification using an electronic-signature verifying module 140 is performed.

The presentation module 118 presents information indicating a result of verification performed by the electronic-signature verifying module 140. For example, when it is determined that information to which an electronic signature verified by the electronic-signature verifying module 140 is added has not been tampered with, the presentation module 118 outputs information (more specifically, for example, a message) indicating that the information has not been tampered with. When it is determined that the information has been tampered with, the presentation module 118 outputs information indicating that the information has been tampered with. When an electronic certification has been expired, the presentation module 118 outputs information indicating that the electronic certification has been expired. Moreover, when it is determined, by verification which is performed by a verification-result-and-validity-period verifying module 160, that a combination of information, an electronic signature, and validity-period information indicating the validity period of an electronic signature has not been tampered with, the presentation module 118 outputs information indicating that the information to which the verified electronic signature is added has not been tampered with. Accordingly, a case is supposed, in which verification has been previously performed on the information, in which a result of the verification is stored, in which the electronic certification used in the verification is presently within the validity period thereof, and in which it is determined that a combination of the information, the electronic signature, and the validity-period information indicating the validity period of the electronic certification has not been tampered with. In this case, the presentation module 118 outputs information indicating that the information has not been tampered with, without performing verification for the electronic signature that is added to the information.

Note that, here, the term "outputting" refers to outputting to a device that presents information, a program, or the like (more specifically, for example, a display device connected to the information processing apparatus 100, or a web browser of another information processing apparatus connected to the information processing apparatus 100 via a communication line). More specifically, examples of outputting include not only display on a display device such as a display, but also printing using a printer device such as a printer and outputting of a sound to a sound output device such as a speaker, and may include a combination thereof.

The document/electronic signature/verification result storage module 120 is connected to the verification-result acquisition module 116 of the verification instruction module 110 and to a verification-result generation module 150. A time-stamp processing module 156 causes the document/electronic signature/verification result storage module 120 to store information, an electronic signature, a hash value to which a time stamp is added, and validity-period information so that the information, the electronic signature, the hash value, and the validity-period information correspond to one another. Furthermore, the verification-result acquisition module 116 acquires the combination of the information, the electronic signature, the hash value to which a time stamp is added, and the validity-period information from the document/electronic signature/verification result storage module 120 in accordance with the instruction that has been accepted by the verification-instruction acceptance module 112.

Figure 4:
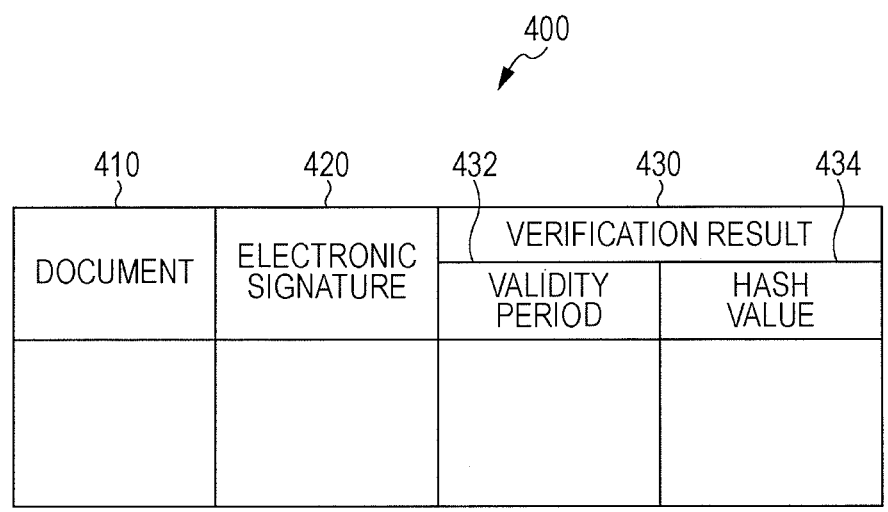
FIG. 4 is an explanatory diagram illustrating an example of a data configuration of a signature association table.

The document/electronic signature/verification result storage module 120 stores, more specifically, for example, a signature association table 400. FIG. 4 is an explanatory diagram illustrating an example of a data configuration of the signature association table 400.

The signature association table 400 has a document column 410, an electronic-signature column 420, and a verification-result column 430. The verification-result column 430 has a validity-period column 432 and a hash-value column 434.

An electronic document is stored as information in the document column 410. For example, a document name or a place at which the electronic document is stored, such as a uniform resource locator (URL), may be stored.

An electronic signature that is added to the electronic document is stored in the electronic-signature column 420. For example, a place at which the electronic signature is stored, such as a URL, may be stored.

The validity period of an electronic certification is stored in the validity-period column 432. When multiple electronic certifications exist, multiple validity periods are stored.

A hash value of a combination of pieces of information that are individually stored in the document column 410, the electronic-signature column 420, and the validity-period column 432 is stored in the hash-value column 434. Note that a time stamp is added to the hash value by the time-stamp processing module 156.

Note that, in a case in which verification using the electronic-signature verifying module 140 has not been performed (which includes a case in which it is determined that the electronic signature has been tampered with), the validity-period column 432 and the hash-value column 434 are in a state in which nothing is stored therein (a so-called NULL state). In this case, it is impossible for the verification-result acquisition module 116 to acquire a hash value and validity-period information.

The verification processing module 130 has the electronic-signature verifying module 140, the verification-result generation module 150, and the verification-result-and-validity-period verifying module 160. The verification processing module 130 mainly performs verification of an electronic signature to obtain a verification result, causes the document/electronic signature/verification result storage module 120 to store the verification result, performs verification using the verification result, and so forth.

The electronic-signature verifying module 140 performs verification of an electronic signature on the basis of an electronic certification corresponding to the electronic signature in accordance with the instruction that has been accepted by the verification-instruction acceptance module 112. Verification that is typically used may be performed as verification performed by the electronic-signature verification module 140. For example, suppose that an electronic signature is obtained by calculating a hash value of an electronic document and by encrypting the hash value (which is also called a message digest) using a secret key. In this case, the electronic signature may be decrypted using an electronic certification that serves as a public key corresponding to the secret key to obtain a hash value. Then, a hash value of the electronic document may be calculated, and may be compared with the hash value that has been obtained by decrypting the electronic signature. When the hash values coincide with each other, it may be determined that the electronic signature has not been tampered with, and, when the hash values do not coincide with each other, it may be determined that the electronic signature has been tampered with. Note that calculation of a hash value of an electronic document is calculation of a hash function using the electronic document in plane text as an argument, and a result of the calculation of the hash function is a hash value.

The verification-result generation module 150 has a validity-period-of-electronic-certification extraction module 152, a hash-value calculation module 154, and the time-stamp processing module 156, and is connected to the document/electronic signature/verification result storage module 120. The verification-result-and-validity-period verifying module 160 mainly causes the document/electronic signature/verification result storage module 120 to store a result of verification performed by the electronic-signature verifying module 140.

The validity-period-of-electronic-certification extraction module 152 acquires validity-period information indicating the validity period of an electronic certification that has been used in verification. An electronic certification is issued by an electronic-certification issuer, and the validity period of the electronic certification is determined. For example, the validity period can be browsed using a server that is managed by the electronic-certification issuer, and validity-period information indicating the validity period of the electronic document is acquired by referring to the validity period. When multiple electronic signatures are added, the validity periods of corresponding electronic certifications are acquired. The electronic-signature verifying module 140 determines whether or not the electronic certification is presently within the validity period using the validity-period information, which has been acquired by the validity-period-of-electronic-certification extraction module 152, indicating the validity period of the electronic signature. When it is determined that the electronic certification is presently within the validity period, the electronic-signature verifying module 140 performs verification. When the electronic certification is presently not within the validity period, the electronic-signature verifying module 140 may cause the presentation module 118 to present a message saying so.

When it is determined that information to which an electronic signature verified by the electronic-signature verifying module 140 is added has not been tampered with, the hash-value calculation module 154 calculates a hash value of a combination of the information, the electronic signature that is added to the information, validity-period information, which has been acquired by the validity-period-of-electronic-certification extraction module 152, indicating the validity period of an electronic certification corresponding to the electronic signature. Any sequence of the information, the electronic signature, and the validity-period information indicating the validity period of the electronic certification may be used in the combination thereof, and another piece of information may be added to the combination. As a matter of course, a case in which multiple electronic signatures exist is included, and, in association with the case, a case in which multiple pieces of validity-period information indicating the validity periods of electronic certifications also exist is also included.

Furthermore, when multiple electronic signatures are added, the hash-value calculation module 154 may calculate a hash value using validity-period information indicating the shortest validity period among the validity periods of electronic certifications corresponding to the respective electronic signatures. There is a case in which multiple electronic certifications that are to be used for verification exist. When it is determined that multiple electronic certifications exist, a validity period that is closest to the present date and time among multiple validity periods is selected, and a hash value is calculated.

The time-stamp processing module 156 adds a time stamp to the hash value that has been calculated by the hash-value calculation module 154. For example, the time-stamp processing module 156 performs a process of adding a time stamp using a time-stamp server (a time-stamping authority which is a third party) that is connected via a communication line. More specifically, the time-stamp processing module 156 performs the process using, for example, "IETF RFC 3161 (Time Stamp Protocol)" that is determined as a standard.

Then, the time-stamp processing module 156 performs control so that the document/electronic signature/verification result storage module 120 is caused to store the information to which the verified electronic signature is added, the electronic signature, the hash value to which a time stamp is added, and the validity-period information so that the information, the electronic signature, the hash value, and the validity-period information correspond to one another.

The verification-result-and-validity-period verifying module 160 determines whether or not an electronic certification is presently within a validity period indicated by validity-period information that has been acquired by the verification-result acquisition module 116. In other words, the verification-result acquisition module 116 determines whether or not the electronic certification is presently within the validity period, thereby determining whether or not a verification result can be utilized. Then, in a case in which the verification-result-and-validity-period verifying module 160 determines that the electronic certification is presently within the validity period, the verification-result-and-validity-period verifying module 160 performs verification of a hash value to which a time stamp is added. Verification in this case may be performed, for example, as follows: a hash value may be obtained by decrypting, using a public key that is obtained from a time-stamp server 240, the hash value to which a time stamp is added, and may be compared with a hash value that has been calculated for a combination of information, an electronic signature, and the validity-period information indicating the validity period of an electronic certification; when the hash values coincide with each other, it may be determined that the electronic signature has not been tampered with; and, when the hash values do not coincide with each other, it may be determined that the electronic signature has been tampered with.

Furthermore, when it is determined by the verification-result-and-validity-period verifying module 160 that the electronic certification is presently not within the validity period, the verification-instruction control module 114 performs control so that verification using the electronic-signature verifying module 140 is performed.

Figure 2:
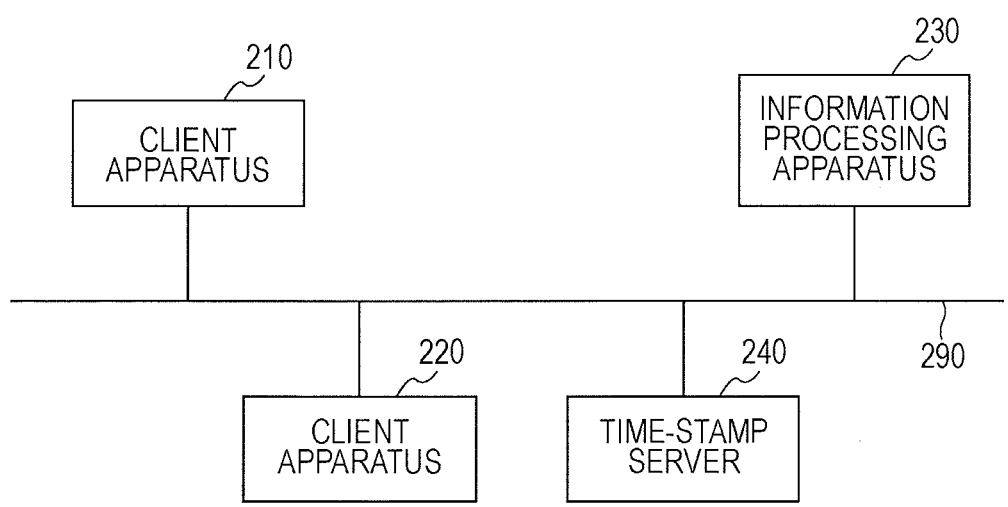
FIG. 2 is an explanatory diagram illustrating an example of a system configuration for realizing the present exemplary embodiment.

FIG. 2 is an explanatory diagram illustrating an example of a system configuration for realizing the present exemplary embodiment.

Client apparatuses 210 and 220, an information processing apparatus 230, and the time-stamp server 240 are connected to each other via a communication line 290.

Users operate the client apparatuses 210 and 220, thereby providing, for the information processing apparatus 230, an instruction for performing verification of electronic signatures that are added to electronic documents.

The information processing apparatus 230 corresponds to the information processing apparatus 100 that is illustrated in FIG. 1 as an example. The information processing apparatus 230 accepts an instruction provided from a user, and performs a verification process. If a verification result obtained by previously performing verification exists, the information processing apparatus 230 utilizes the verification result.

The time-stamp server 240 adds a time stamp to the verification result.

Figure 3:
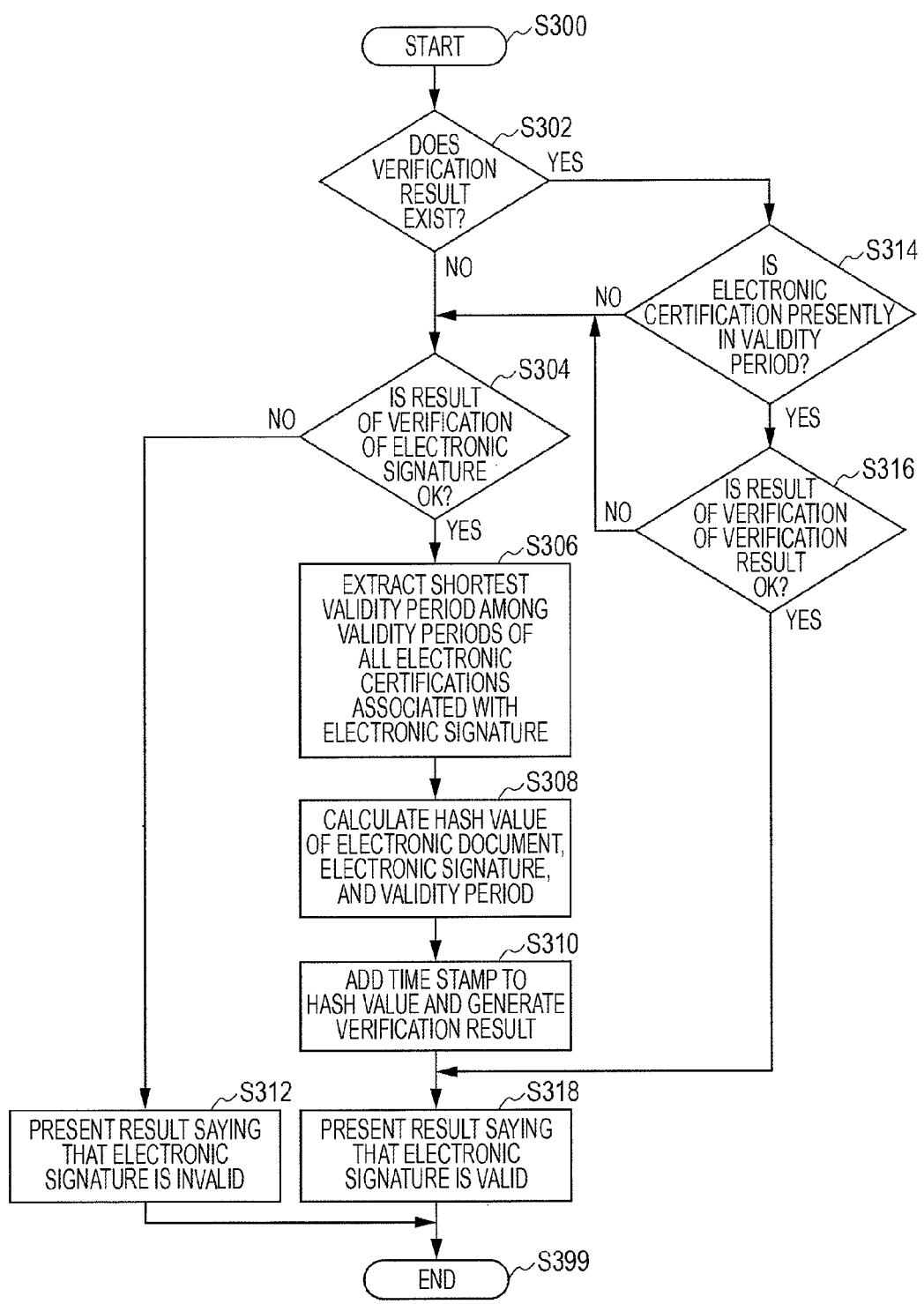
FIG. 3 is a flowchart illustrating a process example in the present exemplary embodiment.

FIG. 3 is a flowchart illustrating a process example in the present exemplary embodiment. Note that the verification-instruction control module 114 controls the entire flow.

In step S302, the verification-result acquisition module 116 acquires a verification result from the document/electronic signature/verification result storage module 120. When the verification-result acquisition module 116 has acquired a verification result, the process proceeds to step S314. Otherwise, the process proceeds to step S304.

In step S304, the electronic-signature verifying module 140 performs verification of an electronic signature to obtain a verification result. When the verification result is OK (the electronic signature has not been tampered with), the process proceeds to step S306. Otherwise, the process proceeds to step S312.

In step S306, the validity-period-of-electronic-certification extraction module 152 extracts the shortest validity period (i.e., a validity period that is closest to the present date and time) among the validity periods of all electronic certifications associated with the electronic signature.

In step S308, the hash-value calculation module 154 calculates a hash value of a combination of an electronic document, the electronic signature, and the validity period.

In step S310, the time-stamp processing module 156 adds a time stamp to the hash value, and generates a verification result. Then, the time-stamp processing module 156 causes the document/electronic signature/verification result storage module 120 to store the verification result.

In step S312, the presentation module 118 presents a result saying that the electronic signature is invalid.

In step S314, the verification-result-and-validity-period verifying module 160 determines, using a validity period that is stored in the document/electronic signature/verification result storage module 120, whether or not an electronic certification is presently within the validity period. When the electronic certification is presently within the validity period, the process proceeds to step S316. Otherwise, the process proceeds to step S304.

In step S316, the verification-result-and-validity-period verifying module 160 performs verification of the verification result. When the verification result is OK, the process proceeds to step S318. Otherwise, the process proceeds to step S304.

In step S318, the presentation module 118 presents a result saying that the electronic signature is valid.

Figure 5:
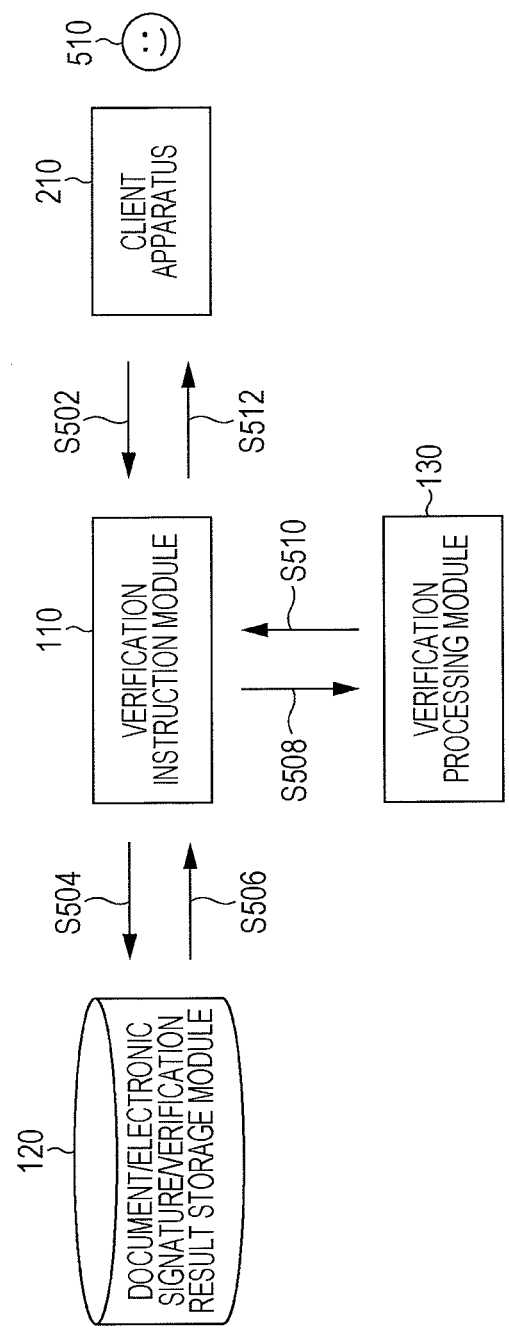
FIG. 5 is an explanatory diagram illustrating a first process example in the present exemplary embodiment.

FIG. 5 is an explanatory diagram illustrating a first process example in the present exemplary embodiment. In the first process example, a case in which a verification result exists is described.

Figure 7:
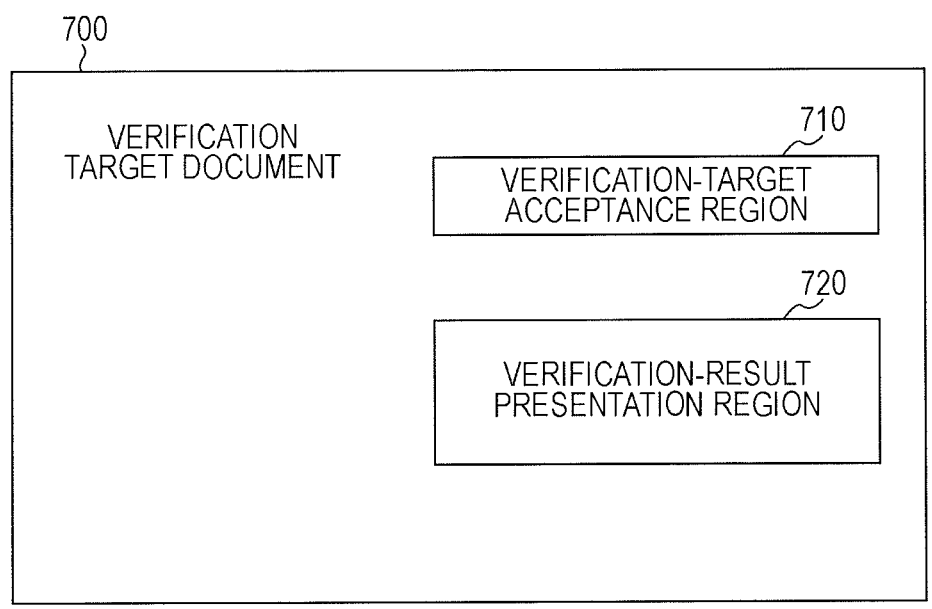
FIG. 7 is an explanatory diagram illustrating an example of presentation of a screen in the present exemplary embodiment.

In step S502, a user 510 performs an operation on the client apparatus 210, thereby transmitting an instruction for performing verification of an electronic signature that is added to an electronic document to the information processing apparatus 100 (the verification-instruction acceptance module 112 of the verification instruction module 110). As illustrated as an example in FIG. 7, the client apparatus 210 presents a verification-target acceptance/verification-result presentation screen 700 in a screen of the client apparatus 210. The user 510 performs an operation, thereby writing the name of an electronic document, which is a target, in a verification-target acceptance region 710, and providing an instruction for verification.

In steps S504 and S506, the verification-instruction control module 114 of the verification instruction module 110 controls the verification-result acquisition module 116 so that the verification-result acquisition module 116 acquires, from the document/electronic signature/verification result storage module 120, as data, the electronic document, which has been specified in step S502, an electronic signature that is added to the electronic document, and a validity period and a hash value that have been stored as a verification result.

In step S508, the verification-instruction control module 114 of the verification instruction module 110 controls the verification-result acquisition module 116 so that the verification-result acquisition module 116 passes the data (the electronic document, the electronic signature that is added to the electronic document, and the validity period and the hash value that have been obtained as a verification result), which has been acquired in step S506, to the verification-result-and-validity-period verifying module 160 included in the verification processing module 130. The verification-result-and-validity-period verifying module 160 calculates a hash value of a combination of the electronic document, the electronic signature that is added to the electronic document, and the validity period that has been obtained as a verification result. The verification-result-and-validity-period verifying module 160 compares the calculated hash value with the hash value that has been acquired in step S506, thereby verifying the calculated hash value.

In step S510, the verification-result-and-validity-period verifying module 160 included in the verification processing module 130 transmits a verification result to the presentation module 118 included in the verification instruction module 110.

In step S512, the presentation module 118 included in the verification instruction module 110 presents the verification result in a screen of the client apparatus 210. As illustrated as an example in FIG. 7, the presentation module 118 presents the verification result in a verification-result presentation region 720 of the verification-target acceptance/verification-result presentation screen 700 of the client apparatus 210.

Figure 6:
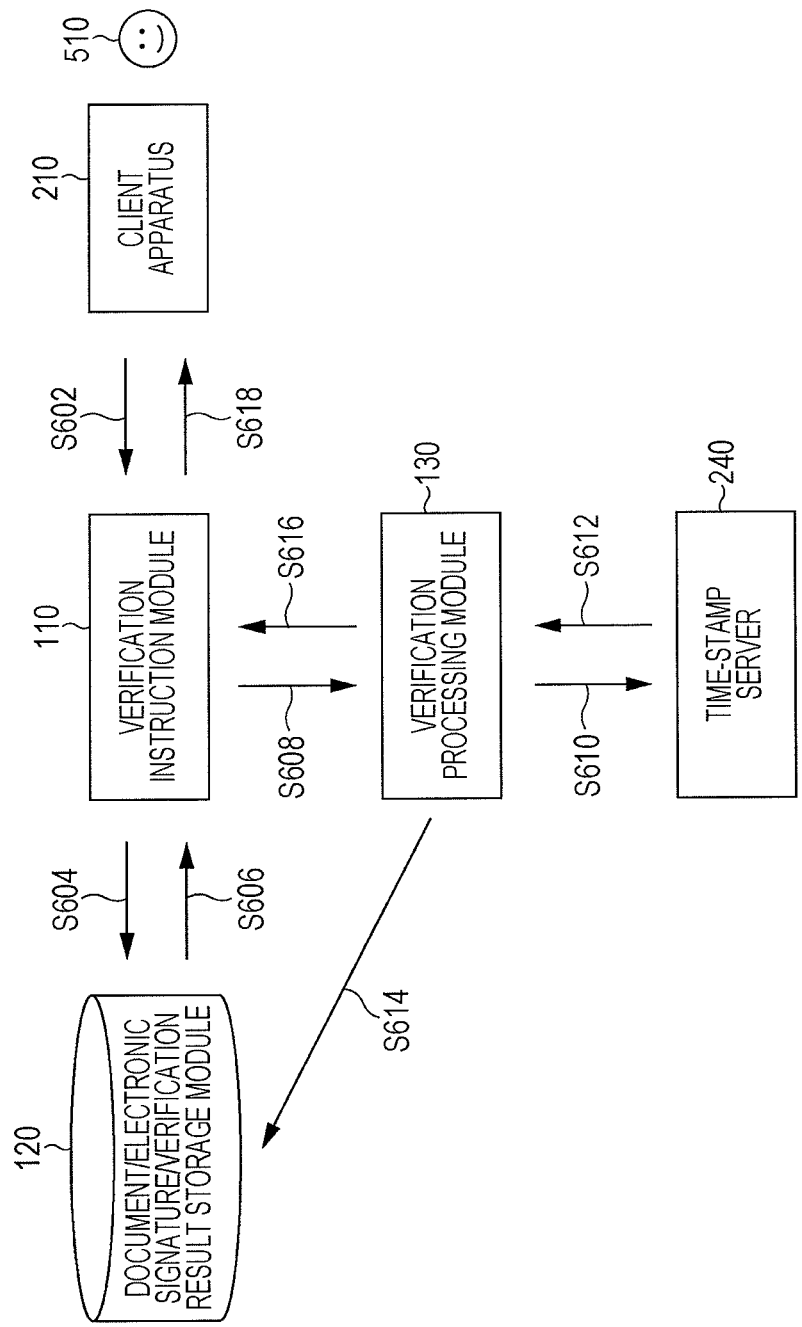
FIG. 6 is an explanatory diagram illustrating a second process example in the present exemplary embodiment.

FIG. 6 is an explanatory diagram illustrating a second process example in the present exemplary embodiment. In the second process example, a case in which a verification result does not exist is described.

In step S602, a process similar to the process in step S502 which is illustrated as an example in FIG. 5 is performed.

In steps S604 and S606, the verification-instruction control module 114 of the verification instruction module 110 controls the verification-result acquisition module 116 so that the verification-result acquisition module 116 acquires, from the document/electronic signature/verification result storage module 120, as data, an electronic document, which has been specified in step S602, and an electronic signature that is added to the electronic document. Note that, in the second process example, it is impossible to acquire a validity period and a hash value as a verification result. Accordingly, verification using the electronic-signature verifying module 140 is performed instead of verification using the verification-result-and-validity-period verifying module 160.

In step S608, the verification-instruction control module 114 of the verification instruction module 110 controls the verification-result acquisition module 116 so that the verification-result acquisition module 116 passes the data (the electronic document and the electronic signature that is added to the electronic document), which has been acquired in step S606, to the electronic-signature verifying module 140 included in the verification processing module 130. The electronic-signature verifying module 140 performs verification of the electronic signature to obtain a verification result.

In steps S610 and S612, when the verification result in step S608 is OK (it is determined that the electronic signature has not been tampered with), the verification-result generation module 150 of the verification processing module 130 extracts a validity period that is closest to the present date and time among the validity periods of electronic certifications that have been utilized to verify the electronic signature. The verification-result generation module 150 calculates a hash value of a combination of the electronic document, the electronic signature, and the validity period. In order to add a time stamp to the hash value, the verification-result generation module 150 transmits the hash value to the time-stamp server 240, and receives a time stamp token from the time-stamp server 240. This time stamp token is the hash value to which a time stamp is added.

In step S614, the time-stamp processing module 156 of the verification processing module 130 causes the document/electronic signature/verification result storage module 120 to store the electronic document, the electronic signature, the validity period, and the hash value to which a time stamp is added.

In step S616, the time-stamp processing module 156 included in the verification processing module 130 transmits a result of verification of the electronic signature, which has been performed in step S608, to the presentation module 118 included in the verification instruction module 110.

In step S618, a process similar to the process in step S512 which is illustrated as an example in FIG. 5 is performed.

Figure 8:
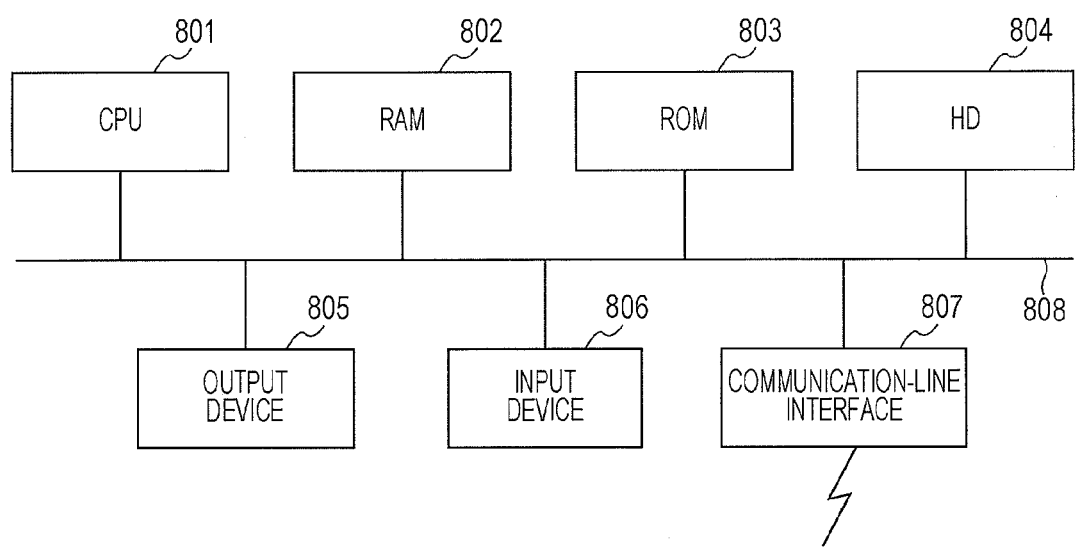
FIG. 8 is a block diagram illustrating an example of a hardware configuration of a computer that realizes the present exemplary embodiment.

Note that a hardware configuration of a computer in which a program is executed to realize the present exemplary embodiment is a hardware configuration of a typical computer as illustrated as an example in FIG. 8. More specifically, the computer is a computer that can be a personal computer or a server, or the like. In other words, as a specific example, a CPU 801 is used as a processing unit (a calculation unit), and a RAM 802, a read-only memory (ROM) 803, and an HD 804 are used as storage devices. As the HD 804, for example, a hard disk may be used. The computer is configured using the following elements: the CPU 801 that executes a program for realizing the verification-instruction control module 114, the verification-result acquisition module 116, the electronic-signature verifying module 140, the validity-period-of-electronic-certification extraction module 152, the hash-value calculation module 154, the time-stamp processing module 156, the verification-result-and-validity-period verifying module 160, and so forth; the RAM 802 that stores the program and data; the ROM 803 in which a program for activating the computer and so forth are stored; the HD 804 that is used as an auxiliary storage device; an input device 806 to which data is input, such as a keyboard or a mouse; an output device 805 such as a cathode ray tube (CRT) display or a liquid crystal display; a communication-line interface 807 for connection to a communication network, such as a network interface card; and a bus 808 for connecting the above elements to each other and for sending and receiving data between the elements. Multiple computers each of which is the above-described computer may be connected to each other using a network.

Regarding realization of the above-described exemplary embodiment using a computer program, a system having the present hardware configuration is caused to read the computer program that is software, and software resource and hardware resource collaborate with each other, thereby realizing the above-described exemplary embodiment.

Note that the hardware configuration illustrated in FIG. 8 is one configuration example. The hardware configuration in the present exemplary embodiment is not limited to the hardware configuration illustrated in FIG. 8. It is only necessary that the hardware configuration be a configuration in which the modules that are described in the present exemplary embodiment can be executed. For example, some modules may be configured using dedicated hardware (for example, an application specific integrated circuit (ASIC)). A configuration in which some modules are provided in an external system and connected via a communication line may be used. Further, multiple systems each of which is the system illustrated in FIG. 8 may be connected to each other via a communication line, and may operate in collaboration with each other. Furthermore, particularly, the system may be incorporated in a personal computer. Alternatively, the system may be incorporated in an information home appliance, a copier, a facsimile machine, a scanner, a printer, a multifunctional machine (an image processing apparatus having at least two functions among a scanner function, a printer function, a copier function, a facsimile function, and so forth), or the like.

Note that the above-described program may be stored on a recording medium, and may be supplied. Furthermore, the program may be supplied using a communication unit. In such a case, for example, regarding the above-described program, it may be considered that a "computer readable recording medium storing a program" is provided as an invention.

The "computer readable recording medium storing a program" is a recording medium which is used to install a program, to execute a program, to distribute a program, or the like, in which a program is stored, and which can be read by a computer.

Note that examples of the recording medium include the following: digital versatile discs (DVDs) including "a DVD-recordable (R), a DVD-rewritable (RW), a DVD-RAM, and so forth", which are standards established by the DVD forum, and including "a DVD+R, a DVD+RW, and so forth" which are standards established by the DVD+RW Alliance; compact discs (CDs) including a CD-ROM, a CD-R, a CD-RW, and so forth; a Blu-ray Disc (registered trademark); a magneto-optical disk (MO); a flexible disk (FD); a magnetic tape; an HD; a ROM; an electrically erasable programmable read-only memory (EEPROM); a flash memory; and a RAM.

Additionally, the above-described program or one portion thereof may be recorded on the recording medium, and may be stored, distributed, or the like. Furthermore, the above-described program may be transmitted by communication using a transmission medium such as a wired network, a wireless communication network, or a combination of a wired network and a wireless communication network. The transmission medium is used, for example, in the following: a local area network (LAN); a metropolitan area network (MAN); a wide area network (WAN); the Internet; an intranet; and an extranet. Moreover, the above-described program may be transported by being superimposed on a carrier wave.

In addition, the above-described program may be one portion of another program. Alternatively, the above-described program may be recorded on a recording medium together with another program. Furthermore, the above-described program may be divided into programs, and the programs may be recorded on multiple recording media. Moreover, the above-described program may be recorded in any manner, such as compression or encryption, if the above-described program that has been recorded can be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program causing a computer to execute a process, the process comprising:
    accepting an instruction for performing verification of an electronic signature which is added to information;
    determining whether the electronic signature has been verified in the past:
    if it is determined that the electronic signature has not been verified in the past:
        verifying the electronic signature on the basis of an electronic certification corresponding to the electronic signature in accordance with the accepted instruction;
        calculating, when it is determined that the information to which the verified electronic signature is added has not been tampered with, a hash value of a combination of the information, the electronic signature which is added to the information, and validity-period information indicating a validity period of the electronic certification corresponding to the electronic signature;
        adding a time stamp to the calculated hash value;
        outputting, to a storage device, the information to which the verified electronic signature is added, the electronic signature, the hash value to which the time stamp has been added, and the validity-period information so that the information, the electronic signature, the hash value, and the validity-period information correspond to one another; and
        outputting a verification result, the verification result indicating that the information has not been tampered with; and
    if it is determined that the electronic signature has been verified in the past:
        determining whether the electronic signature is within a validity period indicated by the validity-period information;
        outputting a verification of the electronic signature without verifying the electronic signature if it is determined that the electronic signature is within the validity period indicated by the validity-period information; and
        if it is determined that the electronic signature is not within the validity period indicated by the validity-period information:
            verifying the electronic signature on the basis of the electronic certification corresponding to the electronic signature in accordance with the accepted instruction:
            calculating, when it is determined that the information to which the verified electronic signature is added has not been tampered with, a hash value of a combination of the information, the electronic signature which is added to the information, and validity-period information indicating a validity period of the electronic certification corresponding to the electronic signature;
            adding a time stamp to the calculated hash value;
            outputting, to a storage device the information to which the verified electronic signature is added, the electronic signature, the hash value to which the time stamp has been added, and the validity-period information so that the information, the electronic signature the hash value and the validity-period information correspond to one another; and outputting a verification result, the verification result including information indicating that the information has not been tampered with.

2. The non-transitory computer readable medium according to claim 1, wherein, when the electronic certification includes a plurality of electronic certifications, the hash value is calculated, in the calculating of the hash value, using validity-period information indicating the shortest validity period among validity periods of the plurality of electronic certifications.

3. An information processing apparatus comprising:

a processor that functions as:

an acceptance unit that accepts an instruction for performing verification of an electronic signature which is added to information;

a verification unit that determines the electronic signature has not been verified in the past and, if it is determined that the electronic signature has not been verified in the past, verifies the electronic signature on the basis of an electronic certification corresponding to the electronic signature in accordance with the instruction which has been accepted by the acceptance unit;

a hash-value calculation unit that calculates, when it is determined that the information to which the electronic signature verified by the verification unit is added has not been tampered with, a hash value of a combination of the information, the electronic signature which is added to the information, and validity-period information indicating a validity period of the electronic certification corresponding to the electronic signature;

a time-stamp addition unit that adds a time stamp to the hash value which has been calculated by the hash-value calculation unit;

an output unit that outputs, to a storage device, the information to which the verified electronic signature is added, the electronic signature, the hash value to which the time stamp has been added by the time-stamp addition unit, and the validity-period information so that the information, the electronic signature, the hash value, and the validity-period information correspond to one another; and a verification-result output unit that outputs a verification result the verification result including information indicating that the information has not been tampered with, wherein the acceptance unit accepts a second instruction for performing verification of the electronic signature, the verification unit determines whether the electronic signature has been verified in the past and determines the electronic signature is within a validity period indicated by the validity-period information and the output unit outputs a verification of the electronic signature without verifying the electronic signature if the verification unit determines that the electronic signature is within the validity period indicated by the validity-period information, and wherein if the verification unit determines that the electronic signature is not within the validity period indicated by the validity-period information, the hash-value calculation unit calculates the hash value of the combination of the information, the electronic signature which is added to the information, and the validity-period information indicating the validity period of the electronic certification corresponding to the electronic signature, the time-stamp addition unit adds a time stamp to the hash value which has been calculated by the hash-value calculation unit, the output unit outputs, to the storage device, the information to which the verified electronic signature is added the electronic signature, the hash value to which the time stamp has been added by the time-stamp addition unit, and the validity-period information so that the information, the electronic signature, the hash value, and the validity-period information correspond to one another, and the output unit outputs the verification result indicating that the information has not been tampered with.

4. An information processing method comprising:

accepting an instruction for performing verification of an electronic signature which is added to information;

determining whether the electronic signature has been verified in the past;

if it is determined that the electronic signature has not been verified in the past:

verifying the electronic signature on the basis of an electronic certification corresponding to the electronic signature in accordance with the accepted instruction;

calculating, when it is determined that the information to which the verified electronic signature is added has not been tampered with, a hash value of a combination of the information, the electronic signature which is added to the information, and validity-period information indicating a validity period of the electronic certification corresponding to the electronic signature;

adding a time stamp to the calculated hash value;

outputting, to a storage device, the information to which the verified electronic signature is added, the electronic signature, the hash value to which the time stamp has been added, and the validity-period information so that the information, the electronic signature, the hash value, and the validity-period information correspond to one another; and outputting a verification result, the verification result indicating that the information has not been tampered with; and if it is determined that the electronic signature has been verified in the past:

determining whether the electronic signature is within a validity period indicated by the validity-period information:

outputting a verification of the electronic signature without verifying the electronic signature if it is determined that the electronic signature is within the validity period indicated by the validity-period information; and if it is determined that the electronic signature is not within the validity period indicated by the validity-period information:

verifying the electronic signature on the basis of the electronic certification corresponding to the electronic signature in accordance with the accepted instruction;

calculating, when it is determined that the information to which the verified electronic signature is added has not been tampered with, a hash value of a combination of the information the electronic signature which is added to the information, and validity-period information indicating a validity period of the electronic certification corresponding to the electronic signature;

adding a time stamp to the calculated hash value;

outputting, to a storage device, the information to which the verified electronic signature is added, the electronic signature, the hash value to which the time stamp has been added, and the validity-period information so that the information, the electronic signature, the hash value, and the validity-period information correspond to one another; and outputting a verification result, the verification result including information indicating that the information has not been tampered with.

* * * * *